(12) United States Patent
Dierbeck

(10) Patent No.: US 6,173,493 B1
(45) Date of Patent: Jan. 16, 2001

(54) MODULAR HEAT EXCHANGER AND METHOD OF MAKING

(76) Inventor: Robert F. Dierbeck, 2707 Hall Rd., Hartford, WI (US) 53027

( * ) Notice: Under 35 U.S.C. 154(b), the term of this patent shall be extended for 0 days.

(21) Appl. No.: 09/308,280

(22) PCT Filed: Oct. 15, 1998

(86) PCT No.: PCT/US98/21745

§ 371 Date: May 17, 1999

§ 102(e) Date: May 17, 1999

(87) PCT Pub. No.: WO99/19683

PCT Pub. Date: Apr. 22, 1999

(51) Int. Cl.[7] ............... F28D 1/053; F28F 9/18
(52) U.S. Cl. ............... 29/890.043; 29/890.054; 165/148; 165/165; 165/173; 165/175; 165/178
(58) Field of Search ............... 165/148, 173, 165/175, 165, 178; 29/890.054, 890.045, 890.043

(56) References Cited

U.S. PATENT DOCUMENTS

| | | |
|---|---|---|
| 1,988,224 | 1/1935 | Wendel . |
| 3,692,105 | 9/1972 | O'Connor . |
| 4,059,147 | 11/1977 | Thorne . |
| 4,195,688 | 4/1980 | Fusie et al. . |
| 4,298,062 | 11/1981 | Pasternak . |
| 4,337,826 | 7/1982 | Kritzer . |
| 4,369,833 | 1/1983 | Pasternak . |
| 4,554,970 | 11/1985 | Pasternak et al. . |
| 4,565,244 | 1/1986 | O'Connor et al. . |
| 5,146,979 | 9/1992 | Zohler . |
| 5,303,770 | 4/1994 | Dierbeck ............ 165/148 X |
| 5,383,517 | 1/1995 | Dierbeck ............ 165/148 X |
| 5,915,470 * | 6/1999 | Dierbeck ............... 165/144 |

FOREIGN PATENT DOCUMENTS

| | | |
|---|---|---|
| 2340711 | 3/1975 | (DE) . |
| 0 132 237 | 6/1984 | (EP) . |
| 1035460 | 6/1965 | (GB) . |
| 2 059 562 | 4/1981 | (GB) . |
| 242919 | 12/1985 | (JP) . |
| 3-225198 * | 10/1991 | (JP) ................. 165/173 |

* cited by examiner

*Primary Examiner*—Leonard Leo
(74) *Attorney, Agent, or Firm*—Andrus, Sceales, Starke & Sawall

(57) ABSTRACT

A modular heat exchanger includes a plurality of tubular modules formed from an aluminum extrusion. Each extruded tube has a generally rectangular cross section, a through bore extending longitudinally therethrough between parallel opposite faces, and parallel longitudinal V-grooves in the faces, all formed in the extrusion process. Each face includes a plurality of parallel fins which are cut into the grooved face in a direction transverse to the grooves. The fins have a generally saw tooth structure so as to increase the turbulence of the air flow through the heat exchanger. Unslotted end faces on the tubes include groove portions which are filled with weld material in both the tube joining process and the end tank welding process, thereby providing an all-welded aluminum heat exchanger of substantially enhanced strength. In another embodiment utilizing an all-welded construction, extended unslotted end faces are cross bored and sealed to provide fluid supply in lieu of the end tanks.

16 Claims, 5 Drawing Sheets

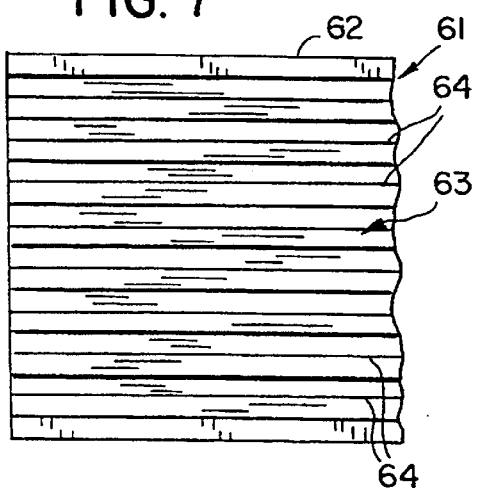
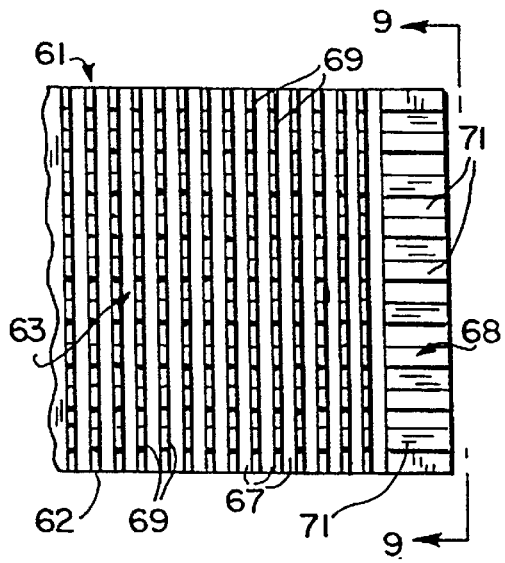
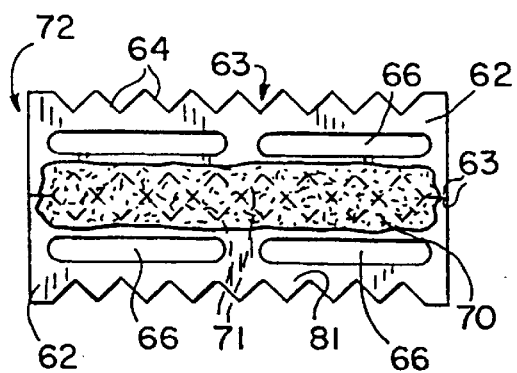
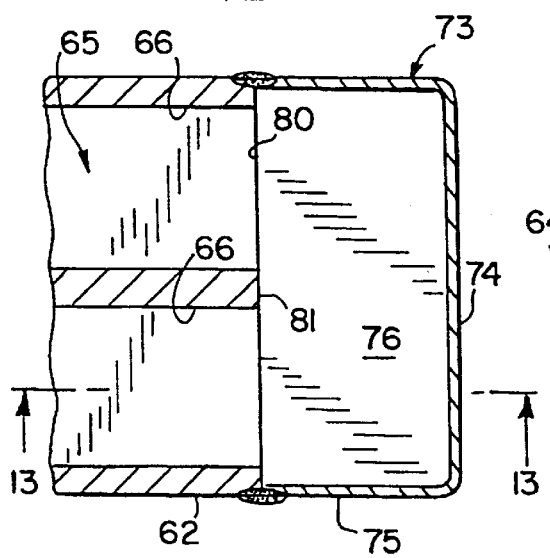
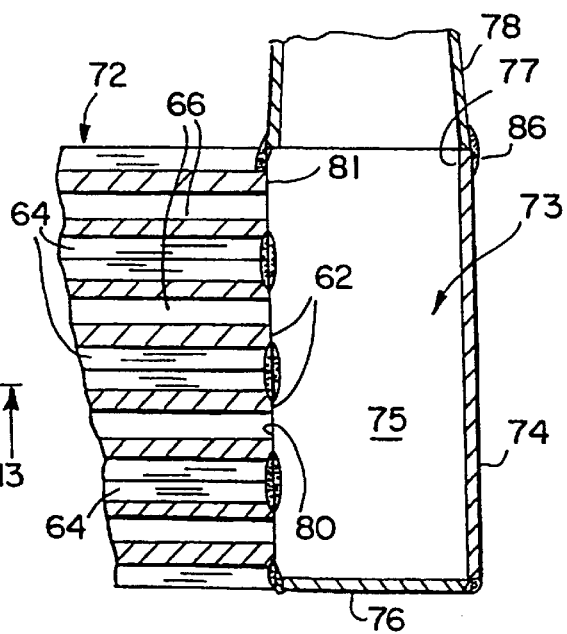

MODULAR HEAT EXCHANGER AND METHOD OF MAKING

BACKGROUND OF THE INVENTION

The present invention relates to a modular heat exchanger wherein each of the core modules is formed from a unitary block of extruded heat exchange material and, in particular, to a heat exchanger that provides enhanced beat dissipation and to a method of making the same using an all-welded construction.

Typically, conventional of heat exchangers for use in automobiles utilize heat exchanging core elements which include a series of generally parallel tubular conduits extending between and attached at their opposite ends to inlet and outlet headers. The tubular conduits are provided with heat conducting and dissipating fins which may be either of a flat plate or serpentine construction, and which are soldered or brazed to the tubular conduits. The conduits, in turn, are soldered or brazed to the headers or to similar fluid accumulating tanks.

The rigid soldered or brazed joints have always constituted a common source of heat exchanger failure and, when the heat exchangers are used in automotive applications, usually require removal of the entire radiator for repair, thereby resulting in down time for the automotive equipment. Thus, there has been a long need and desire for both a heat exchanger having unitary core elements and for one in which braised or soldered connections can be minimized and, preferably, eliminated completely.

U.S. Pat. No. 5,303,770 discloses a modular heat exchanger which includes unitary finned tubular core elements which can be assembled into a multi-module heat exchanger, including flow distributing headers or end tanks without brazed, soldered, or welded connections of any kind. The heat exchanger is fully disassemblable in one embodiment, however, mechanical connectors and a substantial number of o-ring seals are required for assembly. In another embodiment, welded or braised connections may be utilized to provide units which are partially disassemblable. However, these units are potentially subject to the prior art problems of inadequate joint strength and environmentally less desirable materials.

U.S. Pat. No. 5,383,517 discloses a modular heat exchanger having unitary finned tubular core elements which can be assembled without any braised, soldered or welded connections or mechanical connectors. The modules are formed from extruded aluminum blocks into which heat exchanging fins are cut or cold formed. Flow accumulating passages are bored into the ends of the modules. The modules are assembled with a high strength adhesive sealant which simultaneously secures the modules together and seals the peripheries of the bore adhesive sealant which simultaneously secures the modules together and seals the peripheries of the bore passages at the module interfaces. However, it has been found during certain applications, increased heat dissipation by the heat exchanging fins is necessary.

It is an object and feature of the present invention to provide a modular heat exchanger with increased heat dissipating ability.

It is a further object and feature of the present invention to provide a modular heat exchanger wherein the modules may be formed from extruded aluminum blocks in to which the heat exchanging fins are cut.

It is a particular object of the present invention to provide such a heat exchanger which utilizes all aluminum components and an all-welded construction.

SUMMARY OF THE INVENTION

In accordance with the method of the present invention, a modular heat exchanger is made by the steps of (1) extruding a rectangular cross section tube which has a longitudinal through bore and opposite faces having parallel longitudinal grooves; (2) cutting parallel slots in the opposite faces which slots are transverse to and extend into the longitudinal grooves to form a pattern of thin toothed fins between opposite unslotted grooved face portions; and (3) welding two of the tubes together in face-to-face relation with welds that fill the abutting grooved face portion. The method preferably also includes the step of welding a tank to the joined tubes to enclose the through bores at the ends of the tubes.

Preferably, the longitudinal grooves formed in the extruding step have V-shaped cross sections. The cutting step comprises cutting the slots to a depth at least equal to the depth of the grooves and, preferably, to a depth greater than the depth of the grooves. In the extruding step, the through bore is preferably formed with a plurality of longitudinally extending ribs.

A variant method for making an all-welded aluminum heat exchanger in accordance with the present invention comprises the steps of: (1) cutting a plurality of equal length tubes from an aluminum extrusion having a rectangular cross section, a longitudinal through bore and longitudinally V-grooved opposite faces; (2) cutting parallel slots in said faces transverse to the grooves to form a plurality of thin parallel toothed fins between opposite unslotted V-grooved face portions; (3) welding pairs of said tubes together in face-to-face relation with aluminum welds that fill the abutting V-grooved face portions to form a heat exchanger core; and, (4) welding an aluminum tank to each end of the core with aluminum welds to enclose the through bores at the ends of the core. The method preferably includes the additional steps of forming a fluid inlet opening in one of said tanks, and forming a fluid discharge opening in the other of said tanks. The method may also include the step of welding respective inlet and outlet pipes to said inlet and outlet openings.

An all-welded heat exchanger of the present invention comprises a plurality of rectangular cross section tubes, each of which has a longitudinal through bore and opposite faces having parallel longitudinal grooves. The faces are provided with parallel slots that extend across the faces transversely to and through the grooves to define thin toothed fins between unslotted grooved face portions. Welded connections are provided to join pairs of tubes in face-to-face relation, the welded connections filling the ends of the grooves in the abutting grooved face portions. A tank is welded to enclose the through bores at the ends of the joined tubes. The tank preferably includes a peripheral edge along which welded seams join the tank to the periphery of the ends of the joined tubes. The tank includes a fluid opening and a fluid transfer pipe is attached to the opening with a welded joint. In the preferred construction, the tubes, and the welded connections, seams and joints are all made of aluminum.

The modified construction of a modular heat exchanger of the present invention is made in accordance with the method comprising steps of (1) extruding a rectangular cross section tube which has a longitudinal through bore and opposite faces having parallel longitudinal grooves, (2) cutting parallel slots in the opposite faces, which slots are transverse to and extend into the longitudinal grooves to form a pattern of thin toothed fins between opposite unslotted groove face portions, (3) providing a cross bore in the tube ends which extend between the opposite face portions and is in fluid communication with the through bore, (4) placing two tubes in face-to-face abutment with the cross bores in axial alignment and the slots defining air flow passages through the abutting tubes, (5) sealing the abutting face portions around the periphery of the aligned cross bores, and (6) welding the abutting tubes together with welds entering the abutting grooved face portions.

BRIEF DESCRIPTION OF THE DRAWINGS

In the drawings:

FIG. 7 is a plan view of one face of the extruded tube used in the construction of a presently preferred embodiment of the invention;

FIG. 8 is a plan view of the extruded tube shown in FIG. 7 after the face has been slotted to form thin heat and dissipating fins;

FIG. 9 is an end elevation view showing the welded connection used to join two of the FIG. 8 tubes to form a heat exchanger core element;

FIG. 12 is a sectional detail taken on line 12—12 of FIG. 11;

FIG. 13 is a sectional detail taken on line 13—13 of FIG. 12;

DETAILED DESCRIPTION OF THE PREFERRED EMBODIMENT

Figure 1:
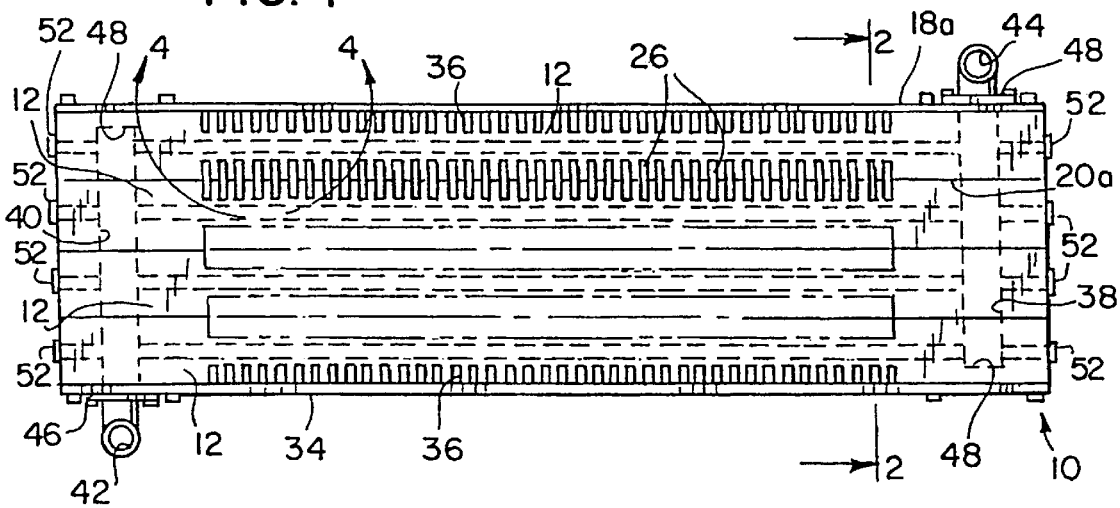
FIG. 1 is a front elevational view of a heat exchanger using the modular construction of the present invention.

Referring to FIG. 1, a heat exchanger in accordance with the present invention is generally designated by the reference numeral 10. Heat exchanger 10 includes a series of identical core modules 12 which, in the heat exchanger shown, comprise four in number. Each module 12 is preferably made from an elongated extruded aluminum block which is generally rectangular in cross section and is formed in an extrusion process with a series of four parallel through bores 14 having flattened or oval cross sections.

A series of parallel fins 16 is formed on each of the opposite faces 18 and 20 of module 12 to overlay the series of through bores 14. The fins 16 are formed so as to extend generally transverse to the axis of the through bores 14.

Figure 2:
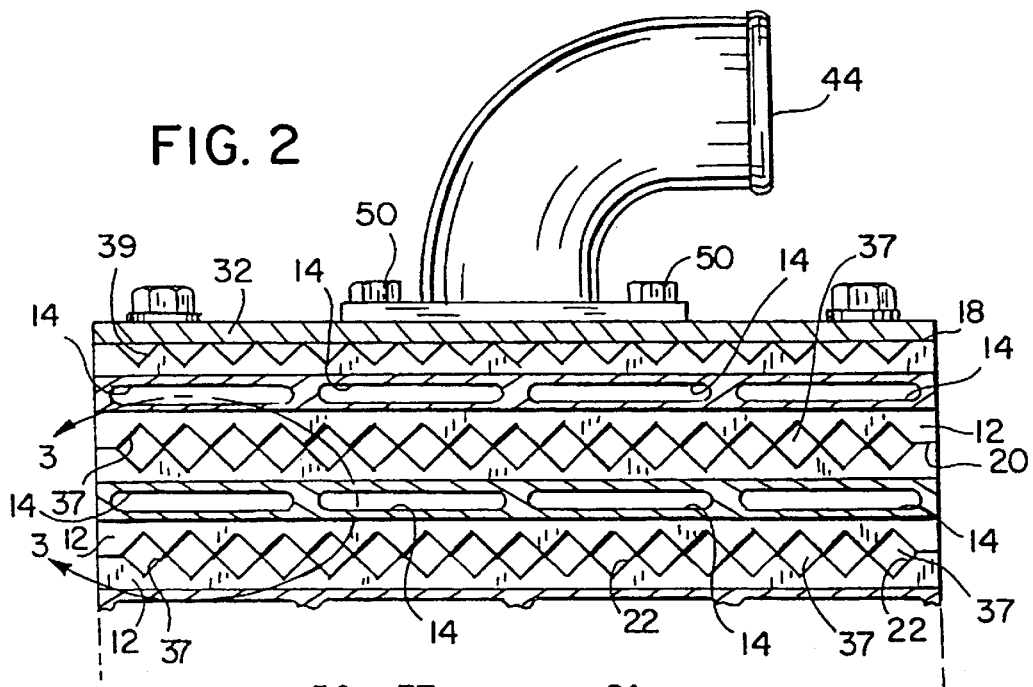
FIG. 2 is a cross-sectional view taken along line 2—2 of FIG. 1.
Figure 3:
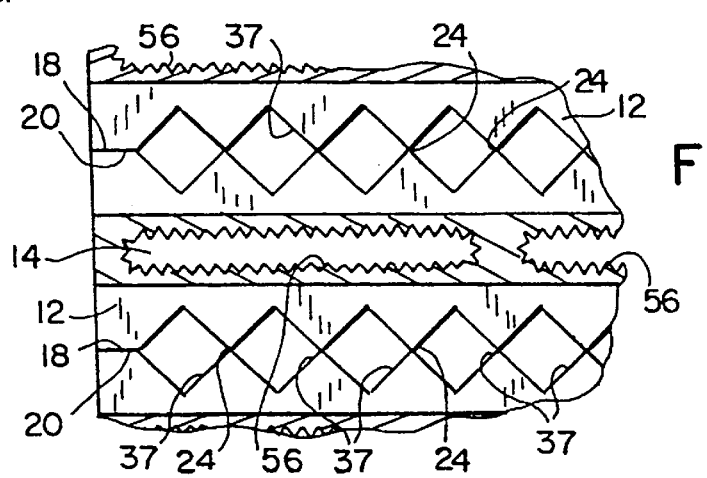
FIG. 3 is an enlarged sectional view taken along line 3—3 of FIG. 2.
Figure 5:
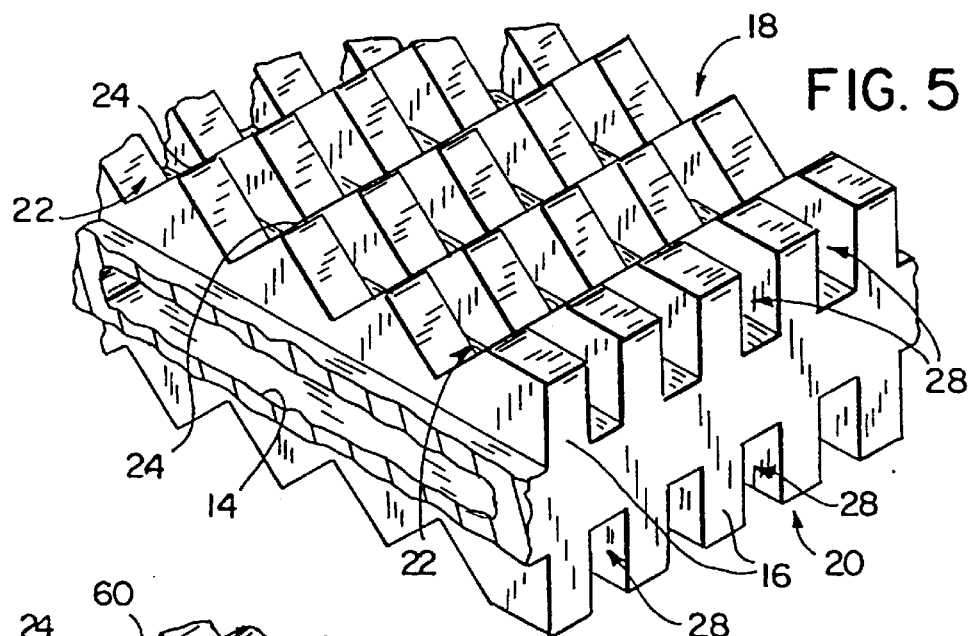
FIG. 5 is an isometric view, partially in section, showing portions of a heat exchanger module for use with the heat exchanger of the present invention.

As best seen in FIGS. 2–3 and 5, a series of parallel, V-shaped grooves or channels 22 are also formed on each of the opposite faces 18 and 20 of module 12 to overlay the series of through bores 14. The V-shaped channels 22 are formed to extend generally parallel to the axis of the through bores 14 such that fins 16 are provided with a generally saw tooth shape. The V-shaped grooves or channels 22 formed in modules 12 provide each fin 16 with additional surface area for enhanced heat transfer. In addition, the V-shaped channels 22 and modules 12 allow for increased air flow through heat exchanger 10 and increase the turbulence of the air flowing therethrough in order to effectuate enhanced heat transfer. The outer edges 24 of each fin 16 lie coplanar with the corresponding planes 18 and 20 in which the fin is formed.

Heat exchanger 10 is formed by stacking the four modules 12 together in face-to-face contact such that the outer edges 24 of each fin 16 engage and abut the outer edges 24 of an adjacent module 12. As best seen in FIG. 1, the modules 12 in the assembled heat exchanger 10 define interior air flow passages 26 between an adjacent modules which are two times the height of fins 16 and as wide as slots 28 between adjacent fins.

The heat exchanger 10 is enclosed between a pair of outer mounting plates 32 and 34 which abut corresponding outer edges 24 of the fins 16 on the outside faces of the outer modules 12 to define a series of outer air flow passages 36. As seen in FIG. 1, outer air flow passages 36 are approximately one-half the height of interior air flow passages 26 and as wide as slots 28 between adjacent fins.

Referring to FIG. 2, the modules 12 in the assembled heat exchanger 10 also define an interior cross air flow passages 37 between adjacent modules. The inner cross air flow passages 37 have a generally diamond shaped cross section having a height which is less than the height of the interior air flow passages 26.

The outer plates 32 and 34 which abut corresponding outer edges 24 of fins 16 on the outside faces of the outer modules 12 also define a series of outer cross air flow passages 39. As best seen in FIG. 2, outer cross air flow passages 39 are approximately one-half the height of interior cross air flow passages 37.

The opposite ends of each face 18 and 20 of each module 12 include corresponding flat face portions 18a and 20a, respectively, in which no fins are provided. In order to assemble heat exchanger 10, the face portions 18a and 20a are covered with a layer of a suitable high strength adhesive to secure the modules together such that the outer edges 24 of each fin 16 engage and abut the outer edges 24 of an adjacent module 12. Similarly, the face portions 18a and 20a of the outer modules are adhesively secured to the abutting surfaces of the corresponding mounting plates 32 and 34, respectively, to complete the assembly.

First and second cross bores 38 and 40 extend through the face portions 18a and 20a in a direction generally perpendicular to the axis of the through bores 14. As best seen in FIG. 1, each cross bore 38 and 40 is positioned on opposite sides of heat exchanger 10 and is dimensioned to intersect all four through bores 14 in each module 12. As described, cross bores 38 and 40 allow for the flow of fluid between the inlet end 42 and the outlet end 44 of heat exchanger 10. In order to prevent leakage of the fluid flowing through heat exchanger 10, the interfaces between adjacent face portions 18a and 20a and cross bores 38 and 40 passing therethrough are sealed about their peripheries by an adhesive layer used to attach and secure the modules 12 together, respectively, as heretofore described.

Each cross bore 38 and 40 is provided as a blind cross bore by providing one end face of each outer module 12 with a blind cross bore portion 48. Similarly, the ends of all the through bores 14 on the ends of heat exchanger 10 must be plugged, as shown in FIG. 1. The plugs 52 may comprise permanent welds, elastomer plugs, or preferably aluminum plugs secured in place within an adhesive or a weld.

Various types of adhesive seal materials may be utilized to secure the modules together, and also to provide other adhesive joints or seals, such as to secure the plugs 52 in place. Various types of adhesive seal materials are more fully described in U.S. Pat. No. 5,383,517 to the inventor of the present invention, and incorporated herein by reference.

Referring to FIG. 3, the through bores 14 may be provided with a plurality of longitudinally extending ribs 56. Ribs 56 provide each through bore 14 with additional surface area for enhanced heat transfer. As will be described in greater detail hereinafter, the ribbed bores 14, as well as the V-shaped grooves or channels 22, are conveniently formed in a continuous extrusion from which the tubular core modules 12 are cut to length.

Figure 4:
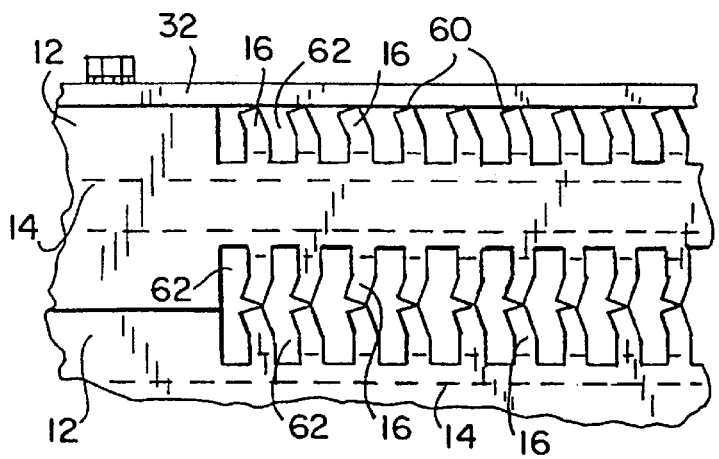
FIG. 4 is an enlarged sectional view taken along line 4—4 of FIG. 1 showing the heat exchanger of the present invention incorporating a second embodiment of a heat exchanger module.
Figure 6:
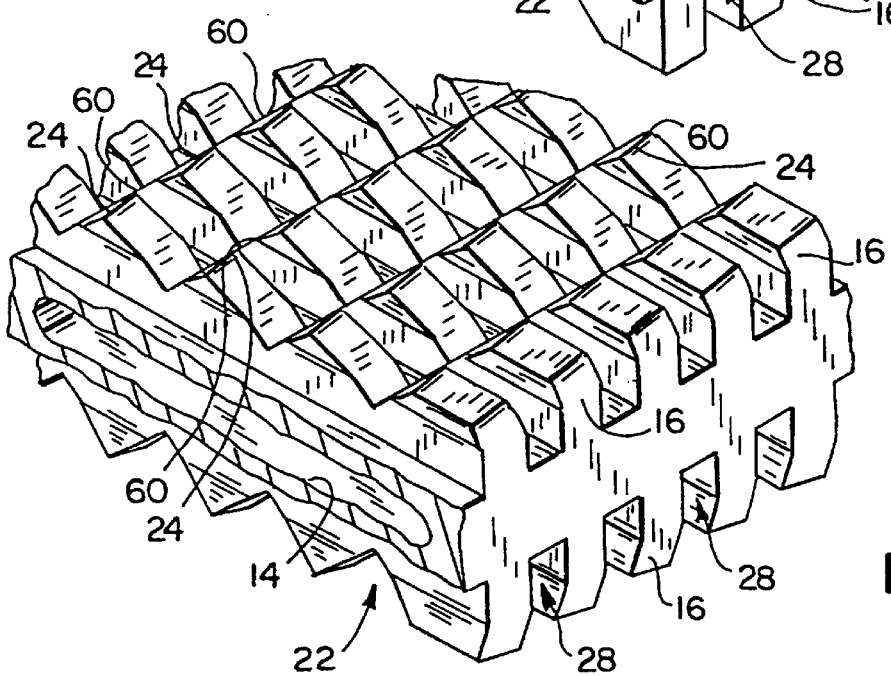
FIG. 6 is an isometric view, partially in section, showing the second embodiment of a heat exchanger module for use in the head exchanger of the present invention.
Figure 10:
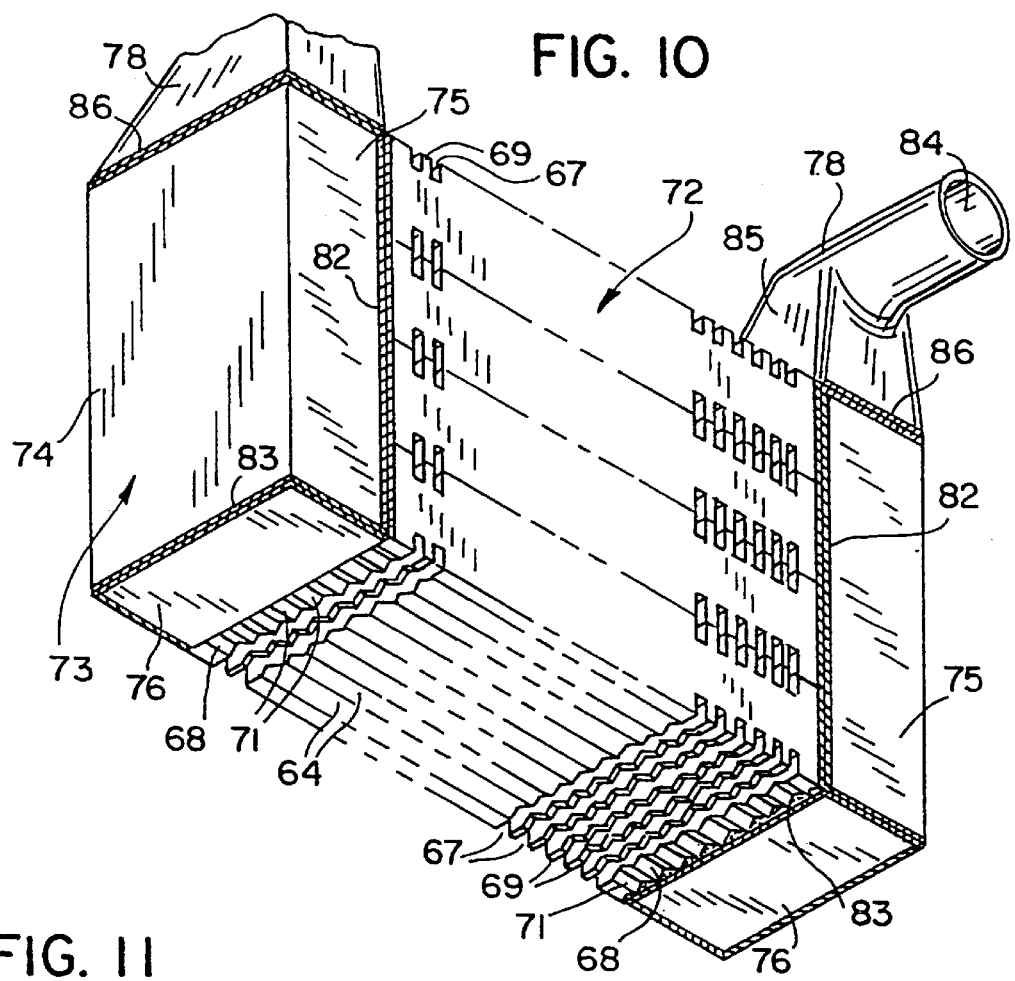
FIG. 10 is a perspective view of a heat exchanger using FIG. 9 core elements and showing attachment of the tanks to the ends thereof.
Figure 11:
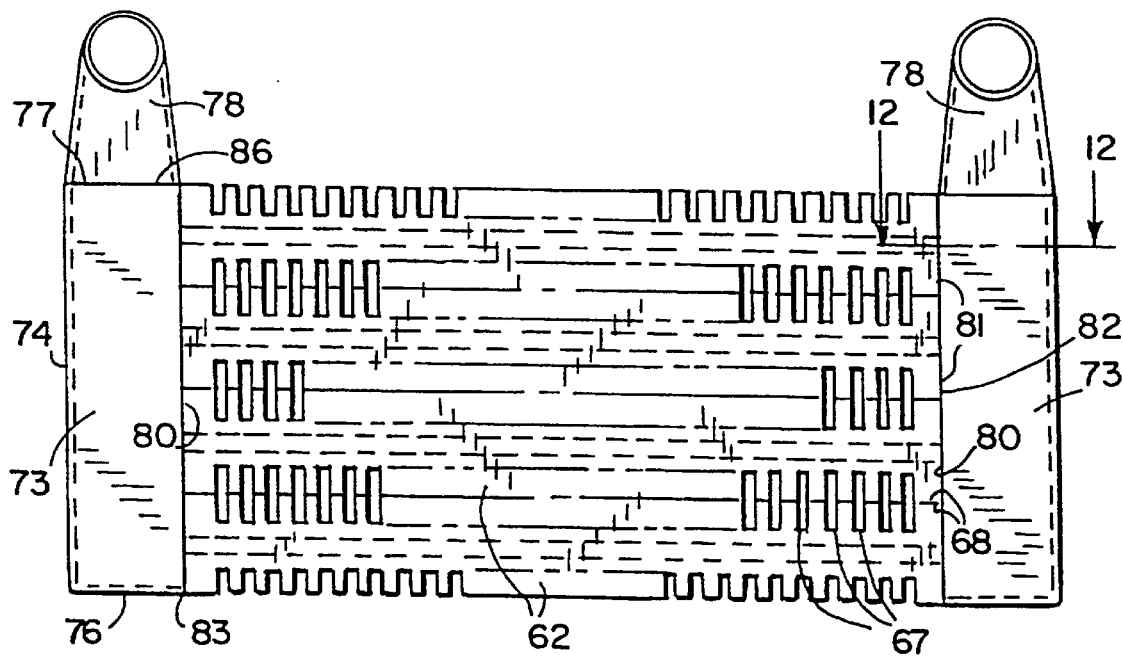
FIG. 11 is a front elevation, similar to FIG. 1, showing the presently preferred construction of the heat exchanger of the present invention.

Referring to FIGS. 4 and 6, it is desirable to increase the turbulence of the air flowing through heat exchanger I 0 in order to improve the heat exchange capability thereof. In order to increase the turbulence of the air flowing through heat exchanger 10, it is contemplated to modify each core module by bending or skewing the fins 16 thereof. The exchanger depicted in FIG. 4 and the core module depicted in FIG. 6 are identical to those previously described but for the bending and/or skewing of the fins, and hence, the previous description of the heat exchanger 10 described in detail will be understood to describe the heat exchanger shown in FIG. 4, with common reference characters being used.

In order to bend or skew fins 16, a fin deformation tool engages the outer edges 24 of each fin 16 thereby causing the bend or skew. As a result, the apex 60 of each outer edge 24 of each fin 16 lies coplanar with the corresponding planes 18 and 20 in which the fins 16 are formed. The heat exchanger of FIG. 4 is formed by stacking modules 12 together in face-to-face contact such that the apex 60 of each outer edge 24 of each fin 16 engages and abuts a corresponding apex of each outer edge 24 of an adjacent module 12. As best seen in FIG. 4, modules 12 in assembled heat exchanger 10 define skewed interior air flow passages 62 between adjacent modules in order to increase the turbulence of the air flowing therepast and effectuate enhanced heat transfer. It is contemplated as being within the scope of the present invention to skew or bend each fin 16 in such a manner that a first outer edge 24 slants from its corresponding apex in an opposite direction to the slant of an adjacent outer edge 24 on the same fin.

Referring now to FIGS. 7–12, a modular heat exchanger and the method of making the same of a presently preferred embodiment will be described. Each of the core modules 61 is similar to the corresponding module 12 of the previously described embodiments. In particular, each module 61 comprises a tube 62 which is initially cut from an aluminum extrusion having an initial configuration as shown in FIG. 7. The extrusion has a generally rectangular cross section and the two wider opposite faces 63 are extruded with a plurality of parallel longitudinal grooves 64. The interior of the extrusion is provided with a continuous longitudinal through bore means 65 which, in the preferred embodiment, comprises a number of identical through bores 66 of oblong cross section, similar to the FIG. 3 construction.

The tubes 62 are cut to equal lengths from the extrusion and the opposite faces 63 are cut to form a series of parallel slots 67 transversely across the full width of the faces, as shown in FIG. 8. The slots 67 are preferably cut to a depth greater than the depth of the grooves 64, resulting in thin toothed fins 69 similar to the previously described embodiments. The slots 67 extend nearly the full length of the tube 62, but terminate at a selected distance from the tube ends to define grooved, but unslotted, face portions 68. Thus, there are four identical face portions 68 on each tube with a face portion located at opposite longitudinal ends of the faces 63 on both sides of the tube.

As best seen in FIG. 9, pairs of tubes 62 are placed in face-to-face relation and joined with welds 70, one on each longitudinal end and running transversely the full width of tubes between the through bores 66. Because the abutting face portions 68 include short groove portions 71, the material of the welds 70 is allowed to penetrate into the groove portions to form an extremely sound and strong welded connection. The welded connection 70 is far superior to a straight seam weld. Additional tubes 62 may be welded to the initially welded two tubes in the same manner to form a heat exchanger core 72.

The heat exchanger core 72, which as indicated may include as many welded tubes 62 as desired, is provided with a fluid distribution tank 73 on each end of the core to enclose all of the through bores 66 at one end of the core in a common tank. Each of the tanks 73 may be of an identical construction and may comprise a single aluminum casting or may be fabricated from an aluminum channel section and a pair of end plates. Each tank 73 includes a top wall 74, a pair of opposite side walls 75 and opposite end walls 76. The end walls may include a suitable inlet or outlet opening 77 to which a fluid transfer pipe 78 is attached, as will be described in greater detail below. The side and end walls 75 and 76, opposite the top wall 74, define a peripheral edge 80 which matches the end perimeter of the core 72 when the tank is placed in abutting contact therewith to enclose the open ends of the through bores 66. With the tank 73 so positioned, it is joined to the end of the core 72 with continuous welded seams along the entire peripheral edge 80 of the tank. In the assembled core 72 and referring particularly to FIGS. 10–12, the flat end portions 81 of the joined tubes 62 (which flat end portions are not cut with transverse slots 67) form a flat surface across the full face of the core and along the edge of which the abutting edge of one side wall 75 of the tank is joined with a continuous welded seam 82. On the ends of the core 72, the tank side walls 75 are joined to the upper ends of the face portions 68 of the outermost tubes 62 in the core. The grooves 64 in these face portions 68 provide openings for the buildup and penetration of weld material to provide welded side seams 83 of enhanced strength. The heat exchanger is completed by attaching the fluid transfer pipes 78 to the respective inlet and outlet openings 77. In the embodiment shown, each of the pipes 78 comprises a cast aluminum elbow having a circular open end 84 adapted for connection to conventional radiator hose, and a rectangular tank end 85 which is welded around its entire periphery to the respective opening 77 in the end wall 76 of the tank. This welded aluminum joint 86 used to connect each of the fluid transfer pipes 78 to their respective tanks 73 completes a heat exchanger made entirely of an all-welded aluminum construction.

The all-welded aluminum construction eliminates potentially weak soldered and braised joints typical of virtually all prior art heat exchangers. In addition, the welded joints, particularly the welds 70 joining the tubes and the side seam welds 83, both of which utilize the groove portions 71 to enhance weld penetration, add considerably to the overall strength of the heat exchanger. The V-grooved tube faces 63, in addition to providing toothed fins with enhanced heat dissipation as described above, also substantially reduce the amount of material required in the manufacture of the extrusion. Similarly, this elimination of material also reduces considerably the cross-cutting time required in forming the slots 67. Another most important benefit in a heat exchanger of all-welded construction, as described herein, is its resistance to thermal shock. It is well known in the art that heat exchangers made with two dissimilar metals with different coefficients of thermal expansion, may crack and rupture if subjected to sudden temperature excursions. The all-welded aluminum construction of this heat exchanger is immune from problems of thermal shock.

In certain applications, it is desirable to treat liquids which are corrosive and not suitable for direct contact with aluminum. A modified embodiment of the present invention, utilizing the extruded and slotted tubes 62, may be utilized. The tubes may be welded together to form a core unit 72 as previously described. The bores 66 are lined with tight-fitting sleeves of a corrosion resistant metal such as stainless steel. These sleeves extend completely through the bores 66 and a short distance beyond on either end of the tubes 62. A stainless steel plate, punched with bore holes to fit closely over the extended ends of the sleeves, is placed on each end of the core 72. The stainless steel plate may have outside dimensions generally matching the end face of the core. The plate preferably lies directly against the end face of the core and is welded to each of the sleeve extensions with a continuous weld around the peripheries thereof. A stainless steel tank with suitable liquid transfer pipes is then welded to the stainless steel plate to complete the enclosing end tank. This construction provides an all-welded heat exchanger which utilizes the heat transfer capability of the extruded aluminum tubes, but also includes a corrosion resistant liquid transfer capability.

Figure 14:
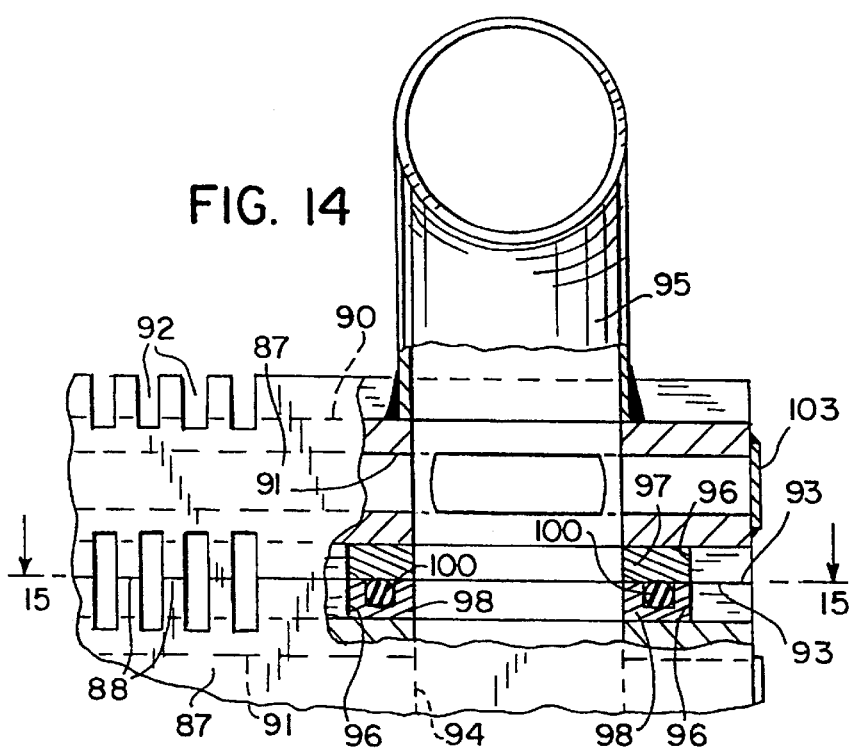
FIG. 14 is a detail of a plan view of a heat exchanger of a modified embodiment.
Figure 15:
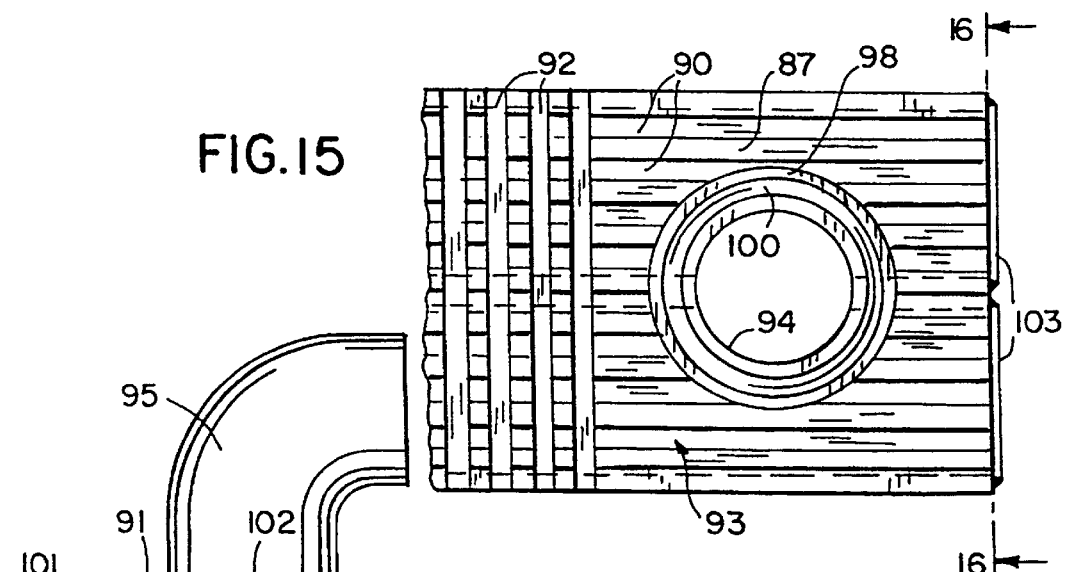
FIG. 15 is a sectional view taken on line 15—15 of FIG. 14.
Figure 16:
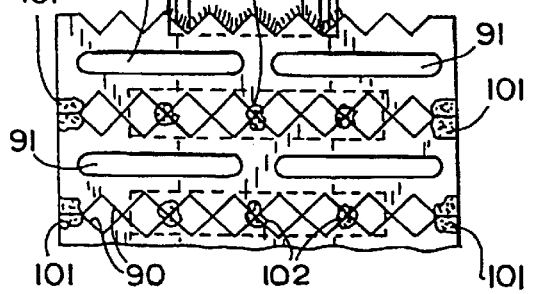
FIG. 16 is an end view taken on line 16—16 of FIG. 15.

Referring to FIGS. 14–16, a modified construction of the heat exchanger, using modified extruded tubes 87 and eliminating the end tanks of the previously described embodiment, is shown. Each of the tubes 87 is cut from an extrusion which may be identical to that shown in FIG. 7. Thus, the opposite faces 88 are formed with V-shaped parallel grooves 90 and interior through bores 91. The opposite faces are then cut to form the transverse slots 92, but unlike the previously described embodiment, larger unslotted ends are provided, resulting in substantially longer face portions 93. A cross bore 94 is formed to extend through each tube 87 with its axis generally centered in the face portion 93 and extending perpendicular thereto. As may be seen in FIGS. 15 and 16, the cross bore 94 is sized and positioned to intersect both of the through bores 91 in each tube 87. In an assembled core unit comprising a plurality of tubes 87 attached in face-to-face abutment, the cross bores 94 on opposite ends of the heat exchanger provide for the accumulation of the operating fluid flowing between inlet and outlet pipes 95.

The interfaces between adjacent abutting face portions 93 at the peripheries of the cross bores 94 must be sealed to prevent leakage of the working fluid. As best seen in FIGS. 14 and 15, each cross bore interface is provided with a facing counterbore 96 which extends at least the depth of the V-groove 90. A rectangular section annular insert is pressed into and fixed in one of the counterbores 96. In the opposite facing counterbore 96, an annular insert 98, of generally U-shaped cross section, is inserted and secured in place. An O-ring 100 is seated in the U-section insert 98 and, when two tubes 87 are brought into face-to-face abutment, the O-ring 100 seals against the adjacent face of the other annular insert 97. Referring particularly to FIG. 16, with a pair of tubes 87, provided with an appropriate O-ring seal 100, pressed into face-to-face engagement, the ends of the tubes are welded together using a welding strategy which will not overheat the ends of the tubes. If a full length weld utilizing sufficient material to fill the ends of the grooves 90 is used, such as a weld 70 described with respect to the FIG. 9 embodiment, the heat generated by the welding process would destroy the O-ring. Therefore, the ends of the tubes 87 are tack welded utilizing a process which includes short seam welds 101 at each end and a series of spaced tack welds 102 joining the outer tips of the V-grooves on adjacent tubes at spaced locations between the seam welds 101. By utilizing sufficient weld material for the tack welds 102, weld material may be caused to flow into and slightly fill the grooves 90 to provide welds of substantially enhanced strength, as opposed to simple surface tack welds. The ends of the through bores 91 may be plugged or capped with sealing devices 103 which may be welded or otherwise secured to seal the bore ends against working fluid leakage.

Each of the heat exchanger constructions described herein is suitable for handling a number of different kinds of fluids. For example, the heat exchanger may be used as a conventional automotive radiator for the engine coolant, a lubricating oil cooler, or an air charged cooler such as used for a turbocharged engine. Virtually the same heat exchanger construction may be utilized for each of the foregoing applications. This embodiment, like each of the previously described embodiments, utilizes an all-welded aluminum construction with all of the benefits attendant thereto.

I claim:

1. A method for making a modular heat exchanger comprising the steps of:
   (1) extruding a rectangular section tube having a longitudinal through bore and opposite faces having parallel longitudinal grooves;
   (2) cutting parallel slots in said faces transverse to and into said longitudinal grooves to form a pattern of thin toothed fins between opposite unslotted grooved face portions; and,
   (3) welding two tubes together in face-to-face relation with welds filling the abutting grooved face portions.

2. The method as set forth in claim 1 including the step of welding a tank to the joined tubes to enclose the through bores at the ends of the tubes.

3. The method as set forth in claim 2 wherein the welding step comprises:
   lining the through bores with sleeves of a material different from that comprising the extruded tubes.

4. The method as set forth in claim 3 wherein said tubes are made of aluminum and said sleeves and tank are made of stainless steel.

5. The method as set forth in claim 1 wherein said extruding step comprises forming said longitudinal grooves with V-shaped cross sections.

6. The method as set forth in claim 1 wherein said cutting step comprises cutting said slots to a depth at least equal to the depth of said grooves.

7. The method as set forth in claim 6 comprising the step of cutting said slots to a depth greater than the depth of said grooves.

8. The method as set forth in claim 1 wherein said extruding step comprises forming said through bore with a plurality of longitudinally extending ribs.

9. A method for making an all-welded aluminum heat exchanger comprising the steps of:
   (1) cutting a plurality of equal length tubes from an aluminum extrusion of rectangular section having a longitudinal through bore and longitudinally V-grooved opposite faces;
   (2) cutting parallel slots in said faces transverse to said grooves to form a plurality of thin parallel toothed fins between opposite unslotted V-grooved face portions;
   (3) welding pairs of said tubes together in face-to-face relation with aluminum welds filling the abutting V-grooved face portions to form a heat exchanger core; and,
   (4) welding an aluminum tank to each end of the core with aluminum welds to enclose the through bores at the ends of the core.

10. The method as set forth in claim 9 including the steps of forming a fluid inlet opening in one of said tanks and forming a fluid discharge opening in the other of said tanks.

11. The method as set forth in claim 10 including the step of welding respective inlet and outlet pipes to said inlet and outlet openings.

12. A welded heat exchanger comprising:
   a plurality of rectangular cross section tubes, each having a longitudinal through bore and opposite faces provided with parallel longitudinal grooves, said faces having parallel slots extending across the faces transversely to and through said grooves to define thin toothed fins between unslotted grooved face portions;
   welded connections joining pairs of tubes in face-to-face relation, said welded connection filling the ends of the grooves in the abutting grooved face portions; and,
   a tank welded to the joined tubes to enclose the through bores at the ends of the joined tubes.

13. The heat exchanger as set forth in claim 12 including welded seams joining the tank along a peripheral edge thereof to the periphery of the ends of the joined tubes.

14. The heat exchanger as set forth in claim 13 including a fluid opening in the tank, and a fluid transfer pipe attached to the opening with a welded joint.

15. The heat exchanger as set forth in claim 14 wherein said tubes and said welded connections, seams and joints are made of aluminum.

16. A method for making a modular heat exchanger comprising the steps of:
   (1) extruding a rectangular section tube having a longitudinal through bore and opposite faces having parallel longitudinal grooves;
   (2) cutting parallel slots in said faces transverse to and into said longitudinal grooves to form a pattern of thin toothed fins between opposite unslotted grooved face portions;
   (3) providing a cross bore in the tube ends extending between the opposite face portions and in fluid communication with the through bore;
   (4) placing two tubes in face-to-face abutment with the cross bores in axial alignment and the slots defining air flow passages through the abutting tubes;
   (5) sealing the abutting face portions around the periphery of the aligned cross bores; and,
   (6) welding the abutting tubes together with welds entering the abutting grooved face portions.

* * * * *